United States Patent [19]

Lin

[11] 3,985,728

[45] Oct. 12, 1976

[54] CARBOXYMETHYLATED MATERIALS DERIVED FROM WOOD MOLASSES AND PROCESS FOR MAKING SAME

[75] Inventor: Stephen Y. Lin, Mount Pleasant, S.C.

[73] Assignee: Westvaco Corporation, New York, N.Y.

[22] Filed: Jan. 2, 1974

[21] Appl. No.: 430,147

[52] U.S. Cl. ............................... 536/120; 106/170; 252/84; 252/180; 252/389 R; 252/558; 536/1; 536/84
[51] Int. Cl.$^2$............................................... C08B 15/02
[58] Field of Search.......... 260/209 R, 231 CM, 212

[56] References Cited
UNITED STATES PATENTS

| | | | |
|---|---|---|---|
| 3,560,480 | 2/1971 | Kruger | 260/231 CM |
| 3,679,658 | 7/1972 | Yueh et al. | 260/209 R |
| 3,712,883 | 1/1973 | Nordgren | 260/209 R |
| 3,740,388 | 6/1973 | Montgomery et al. | 260/209 R |
| 3,740,389 | 6/1973 | Nordgren | 260/209 R |
| 3,833,527 | 9/1974 | Pulkkinen et al. | 260/212 |

OTHER PUBLICATIONS

Oka et al., Chemical Abstracts, vol. 77, No. 16, p. 105599V (English Language Abstract of Japanese Patent No. 72 14,128 dated 4/27/1972).

*Primary Examiner*—Ronald W. Griffin
*Attorney, Agent, or Firm*—Richard L. Schmalz; Ernest B. Lipscomb, III

[57] ABSTRACT

There is disclosed herein carboxymethylated wood molasses and a process for producing this material in an aqueous system to produce an oligomeric, lignocarbohydrate material useful as a detergent builder, herbicide dispersant, corrosion control agent and derusting chemical.

11 Claims, No Drawings

CARBOXYMETHYLATED MATERIALS DERIVED FROM WOOD MOLASSES AND PROCESS FOR MAKING SAME

BACKGROUND OF THE INVENTION

1. Field of the Invention

This invention relates to a process of producing a water-soluble carboxymethyl ether of wood molasses. More particularly, it relates to such a process wherein oligomeric lignocarbohydrate materials derived from soda or carbonate pulping processes, and steam treatments of wood chips, sawdusts and the like are reacted with sodium chloroacetate in the presence of an alkali metal hydroxide and an aqueous medium.

2. The Prior Art

Hemicelluloses as a group of carbohydrates constitute between 40 and 50% of the total carbohydrates in wood. Due to the morphological and chemical characteristics, wood hemicelluloses are easily solubilized with alkaline solutions or with water at an elevated temperature. Thus, large quantities of wood hemicelluloses are removed from wood chips by hydrolytic processes during soda pulping, sodium carbonate semichemical processes, and steam treatments of woody materials. The pulping processes also generate a substantial amount of water-soluble saccharinic acids through alkaline "peeling" and "stopping" reactions of which the mechanisms have been well elucidated in the literature. The alkaline peeling reaction involves enolization, hydrolysis of $\beta$-alkoxycarbonyl bonds and further degradation of the products of hydrolysis to hydroxy carboxylic acids, e.g., isosaccharinic acid. Stopping reactions involve degradation and intramoleculr rearrangements of wood carbohydrates to alkali-stable acids, e.g., glucosaccharinic acid.

Carboxymethylation of carbohydrates is a well known reaction in the prior art. Carboxymethyl cellulose was first patented in German Patent No. 332,703 by Jansen in 1918. Quite recently, a series of patents have been issured to cover the production of carboxymethyl polygalatomannan gum useful as thickening agents, e.g., U.S. Pat. Nos. 3,679,658, 3,712,883, 3,740,388, and 3,740,389. The production of carboxymethyl hemicelluloses recovered from the liquor of cold soda pulping was disclosed in U.S. Pat. No. 3,560,480 which teaches the use of the material as additives in the paper industry. These patents discloses products, the characteristics of which are quite different from those of the subject invention.

Carboxymethylation of carbohydrates, in general, involves a two-step reaction that may be represented as follows:

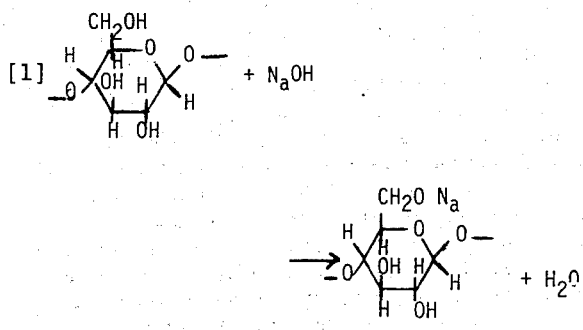

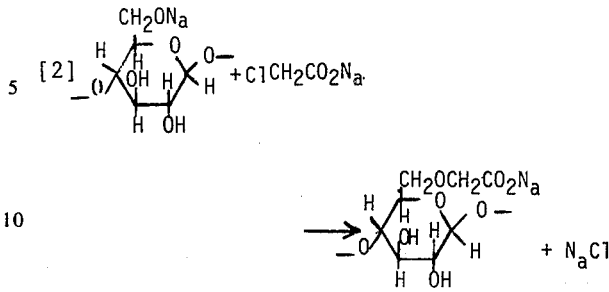

According to reactions [1] and [2], it is essential in the formation of carboxymethyl carbohydrates that adequate amounts of hydroxide and chloroacetate be present for the reactions. However, in the presence of excess hydroxide and water, chloroacetate is hydrolyzed to inactive glycolate which does not react with the ionized hydroxyl groups in the anhydroglucose units and other sugar units of wood carbohydrates. To avoid this difficulty, the excess alkali and water are pressed from the alkali cellulose which is then reacted with dry sodium salt of monochloroacetate. This is possible only in the production of carboxymethyl cellulose, as alkali cellulose forms sheets which may be pressed on a hydraulic ram. With viscous materials like galactomannan and other hemicelluloses which cannot be formed in sheets, organic solvents either alone or in a mixture with a small quantity of water are usually used as diluents to facilitate stirring of the reaction mixture and reduce the extent of hydrolysis of chloroacetate during carboxymethylation. The organic solvents which are particularly useful are methyl sulfoxide (U.S. Pat. No. 3,560,480), isopropyl alcohol and other monohydric alcohols of 2 to 4 carbon atoms (U.S. Pat. No. 3,740,388, U.S. Pat. No. 3,740,389).

Therefore, it is a general object of this invention to provide a water-soluble, carboxymethylated product from wood-based carbohydrates.

Another object of this invention is to provide a process for reacting wood molasses with sodium chloroacetate and an alkali metal hydroxide in an aqueous medium in the absence of a solvent. The system devoid of organic solvents is beneficial for two obvious reasons. First, the process reduces the cost of production by eliminating the use of organic solvents. Second, the process does not need the removal of solvents that is costly and sometimes hazardous.

Still another object of this invention is to provide water-soluble wood-derived products which are good detergent builders, calcium sequestrants, corrosion control agents, herbicide dispersants and de-rusting chemicals.

Other objects, features and advantages of this invention will be apparent from reading the following detailed description.

SUMMARY OF THE INVENTION

In accordance with the present invention, wood molasses is reacted with alkali and chloroacetate in an aqueous system. The present invention specifies that the moisture content of the reaction mixture be less than 20%, or preferably less than 10%. At a low moisture content as such, mechanical stirring becomes a critical factor in producing a product with desired properties. It was discovered that upon addition of an adequate amount of sodium hydroxide, wood molasses becomes rather fluid and easily stirrable.

The resulting oligomeric, ligno-carbohydrates material is useful as a detergent builder, herbicide dispersant, corrosion control agent and de-rusting chemical.

DETAILED DESCRIPTION OF THE PREFERRED EMBODIMENTS

The term "wood molasses" as used herein refers to the class of materials obtained by concentrating the black liquors of soda chemical pulping or sodium carbonate semi-chemical pulping processes after the removal of lignin, and of the steam treatment of the woody substances. The preferred starting materials for the invention thus contain primarily oligomeric water-soluble wood hemicelluloses, containing either reducing sugar end groups or saccharinic end groups, saccharinic acids and, in a lesser amount, ligno-carbohydrate complexes.

PRODUCTION OF WOOD MOLASSES

The process of this invention, in the preferred embodiment thereof involves, as a first step, the production of wood molasses from spent liquors obtained from steam treatment of wood chips, or from pulping of the chips by alkaline processes, including the kraft process and the soda process, and by sodium carbonate semi-chemical process. In the production of wood molasses by a steam treatment, wood chips are charged to a closed vessel and subjected to steam pressure of about 200–1200 pounds per square inch and a temperature of about 200—300° C. for less than 30 minutes. The thermal hydrolysis of wood chips may be carried out in any closed chambers, although it is conveniently and commercially done using a gun as set forth in U.S. Pat. No. 1,824,221 granted to William H. Mason on Sept 22, 1931. Under this treatment, the wood undergoes hydrolysis, and water-insoluble and readily-hydrolyzable constituents thereof are rendered soluble or suspensible in water.

A detailed analysis of the water solubles has indicated that the carbohydrate mixture is composed of oligosaccharides consisting of mannose, arabinose, glucose, galactose, and xylose sugar units; namely, they are degradation products of wood hemicelluloses. The suspended material in the crude hydrolysate may be removed by centrifugation, although this step is not necessary for the purpose of this invention.

To produce wood molasses from pulping black liquors from kraft and soda processes, the liquors are first neutralized with sulfuric acid, hydrochloric acid or carbon dioxide to pH of 4–8, preferably pH 7. Lignin which is insoluble at these pH's is removed from the liquors by centrifugation or filtration. The resultant liquors containing mainly carbohydrates and a small quantity of lignin are concentrated by evaporation under a reduced pressure. The solid content of the concentrates is from 40 to 80%, but preferably between 55 and 65%. Upon concentration of the liquors, excess inorganic salts precipitate out and may be removed by centrifugation. In the case of black liquor from sodium carbonate pulping of wood chips, the liquor is concentrated by evaporation without the removal of lignin as the carbonate process removes primarily carbohydrates and relatively small quantities of lignin from wood chips.

Several purification steps may be taken to remove the unwanted constituents from wood molasses, such as gum, residual lignin, extractives and inorganic salts of one kind or another (mostly sodium chloride when hydrochloric acid is used in neutralization of pulping black liquors). The steps include acidification of black liquors to lower pH's, preferably pH 2, to remove the residual lignin, removal of inorganic ions by ion exchangers and decolorization of the liquors using active carbon and the like.

However, as stated above, the major object of this invention is to provide a simple and effective process of producing carboxymethyl wood molasses. The elaborate steps of purifying wood molasses listed above and the commonly used procedure of precipitating wood carbohydrates such as hemicelluloses in alcohols will not serve the purpose of the present invention. For economical reasons, this invention prefers a process of producing wood molasses wherein the black liquors are neutralized in such a fashion so minimum amounts of inorganic salts are formed and the removal of the salts becomes unnecessary. For these liquors the removal of lignin is not needed and thus neutralization of liquors can be omitted, alkali should be kept in the liquors for the purpose of the latter carboxymethylation reaction. For example, black liquors from carbonate pulping process which contain a considerable amount of residual alkali from pulping but little lignin, need not be neutralized.

CARBOXYMETHYLATION OF THE WOOD MOLASSES

The reaction of sodium chloroacetate and the wood molasses is carried out in the presence of an alkali metal hydroxide. Such hydroxide functions as a reaction initiator by reaction with the available hydroxyl groups of the wood molasses. The resulting alcoholate groups are then capable of reaction with the sodium chloroacetate. As such, it is preferred to use excess alkali metal hydroxide. In parts by weight, it is preferred, for example, to use 50 to 150 parts sodium hydroxide to 100 parts wood molasses. As a first step of the carboxymethylation reaction, the amount of sodium hydroxide is added slowly to wood molasses which is under a vigorous stirring with a mechanical stirrer. The addition of the hydroxide is very exothermic. The preferred solid content of wood molasses is from 50 to 75%. Wood molasses at the high concentrations is thick, viscous material. After addition of hydroxide, it becomes rather fluid and readily stirrable. The rate at which the hydroxide is added is not critical, although it is desirable to continue stirring of the mixture after completion of the addition of hydroxide for 30 minutes so a uniform fluid paste of hydroxide-molasses mixture is formed.

Then a proper amount of dry powder of sodium chloroacetate is added gradually to the mixture while under stirring. The viscosity of the reaction mixture increases with the addition of chloracetate and stirring can become difficult. To alleviate this stirring problem, the mixture should be kept at a temperature of 55° to 100° C., preferably about 75° C., and the addition of chloracetate is carried out at a minimum rate. The reaction between wood molasses and chloroacetate is also exothermic and rapid, and tends to reduce the viscosity of total reaction mixture. By controlling the addition rate of chloroacetate and temperature, it is possible to maintain the the viscosity of the mixture low enough for good stirring. Whenever the stirring becomes difficult, a small quantity of water may be added to the mixture. However, the moisture content of the final reaction mixture is kept below 40% preferably below 20% in order to obtain a product having a good calcium complexing property. The reaction time is not critical although it is desirable to complete the reaction in a reasonable time, usually from 1 to 24 hours, preferably 2 to 4 hours at 25° to 100° C. The amount of sodium chloroacetate employed vary from 50 parts to 200 parts per 100 parts wood molasses. But, it is preferred to use 100 to 150 parts of sodium chloroacetate.

At the completion of the reaction, it is preferred to neutralize the product by the addition of an acid such as acetic, sulfuric, hydrochloric and the like if the product is intended for uses as detergent builders, corrosion control agents and herbicide dispersants. The neutralization is not necessary if the product is intended for uses as de-rusting agents wherein alkali is an ingredient in the chemical formulation.

Color of wood molasses may be a major hindrance to many applications using this material where appearance of chemicals plays an important role in both psychological and technical acceptance. This is particularly true when carboxymethyl wood molasses is used as detergent builders. It has been found that a treatment with some reducing agents or oxidants reduces the color of the product to an acceptable level at which the addition of the product to a laundry washing bath does not cause observable staining of the washed fabric. The decolorizing chemicals are chosen from the g roup of sodium borohydride, sodium dithionite, bromine and hydrogen peroxide. Among these, sodium dithionite possesses particularly strong color reducing power for carboxymethyl wood molasses. The color of 1 gram of carboxymethylated wood molasses may be reduced for 11 to about 60% with 0.2 gram of chemical at room temperature.

Thus, the general carboxymethyl wood molasses proves to be a good and water-soluble calcium sequestrant, having a calcium complexing value of at least 0.7 $\times 10^{-3}$ moles/gram; and it does not gel upon addition of a large amount of calcium in its aqueous solution. This latter property is particularly important in its applications as corrosion control agents and detergent builders in aqueous systems, and that is lacking in carboxymethyl polygalactomannan. Carboxymethyl polygalactomannan claimed in the aforementioned patents was intended to be used as a thickener for a variety of food products when complexed with calcium. Although no calcium complexing value of carboxymethyl polygalactomannan per se was claimed in these patents, it was shown, however, that an amount of $2.6 \times 10^{-3}$ moles of calcium ions was capable of increasing the apparent viscosity of 1% sodium carboxymethyl galactomannan gum aqueous solution from 780 cps to 33,000 cps at 25° C. On the contrary, no measurable viscosity can be observed in 2% aqueous solution of carboxymethyl wood molasses upon addition of $2.5 \times 10^{-2}$ moles of calcium ions. Without limiting the theoretical considerations, the striking difference between the properties of calcium salts of carboxymethyl wood molasses and polygalactomannan may be attributed to the fact that wood molasses defined herein contains mainly oligomeric and, in lesser quantities, lower molecular weight wood carbohydrates and acid derivatives, whereas polygalactomannan like cellulose is a polymeric substance.

For the purpose of the invention, a spectrophotometric titration technique was developed for measuring the calcium complexing capacity of carboxymethyl wood molasses and comparative chemicals. The technique employes oxalate ions as a titration end point indicator. The principle of the titration is set forth as follows: In the presence of a complexing agent, oxalate ions [Ox] and the agent [K] complete for available calcium ions according to the following equations:

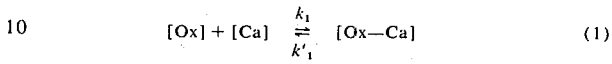
(1)

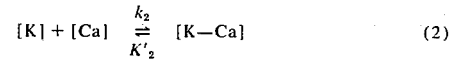
(2)

where $k_1$ and $k_2$ are formation constants of calcium-oxalate [Ox-Ca] and calcium-sequestrant [K-Ca] complexes, respectively. The terms "sequestrant" and "complexing agent" are used interchangeably herein. For simplicity, charges of the above components are omitted. Under the condition that processes (1) and (2) are irreversible, when calcium is added to a mixture of oxalate and sequestrant, the radio of complexes formed, [Ox-Ca]/[K-Ca], is determined by the partition function, $k_1/k_2$. Thus, the rate of accumulation of oxalate-calcium complex increases with $k_1/k_2$. As a result, a sequestrant with a large formation constant tends to delay the accumulation of enough insoluble oxalate-calcium particles to form a colloidal suspension and consequently the turbidity of the titrated solution. On the other hand, if the processes are reversible, the ratio [Ox-Ca]/[K-Ca] becomes a complex function of the formation constants as well as the dissociation constants, $k'_1$ and $k'_2$. At equilibrium, a limited supply of calcium to the system will result in the predominnt formation of a complex a stronger formation constant. In this case, any sequestrants with formation constants smaller than oxalate should yield the same titration end-point and thus cannot be differentiated. However, if $k_1$ and $k_2$ are much larger than $k'_1$ and $k'_2$, respectively, and/or the titration is carried out in a short period of time so that the equilibrium is not reached, one may expect the ratio [Ox-Ca] to be approximately proportional to $k_1/k_2$. As a result, the appearance of turbidity of the titrated solution is delayed proportionally to the formation constant of a sequestrant.

STANDARD SOLUTIONS

Solution A — ammonium oxalate, $(NH_4)_2C_2O_4.H_2O$, ACS reagent grade (60 grams) is dissolved in one liter of doubly distilled (d.d.) water.

Solution B — calcium acetate, $Ca(CH_2COO)_2.H_2O$ (8.8 grams) is boiled in 500 ml distilled water for 10 minutes. Cool the solution to room temperature and then dilute it to 1 liter with d.d. water. Store the solution in a stoppered volumetric flask under a nitrogen atmosphere.

PROCEDURE OF TITRATION

A sequestrant (1 gram) is dissolved in d.d. water (50 ml) and adjusted to pH 10.0 with 0.2 N NaOH. Add 0.2 ml of Solution A and titrate the mixture with Solution B. The turbidity of the solution is measured by absorbance at 550 nm on a spectrophotometer. The minimum amount of calcium acetate per gram of sequestrant needed to incur the inceptive turbidity of the titrated solution (expressed in moles per gram) is called relative sequestering capacity. The relative sequestering capacity $[Ca(CH_3CO_2)_2]_{ppt}$ has been found to correspond to the complexing value, expressed as moles of calcium ions bound to one gram of sequestrant, in the following relationship:

Complexing Value, $[Ca^{2+}]_{bound}$ (moles/gram) = $0.35 \times 10^{-3} + 0.597 [Ca(CH_3CO_2)_2]_{ppt}$ (moles/gram)

The following examples serve to illustrate certain preferred embodiments of the invention. The examples shown the conditions of making carboxymethyl wood molasses and include comparison to similar chemicals. Additionally, there are examples directed to various uses of the products of this invention.

EXAMPLE 1

This example illustrates the effects on complexing capacity of the carboxymethylated wood molasses product of varying the temperature. Into several (5) one liter round bottom reaction flasks fitted with a thermometer, stirrer and condenser were each added 154 grams of wood molasses from steam treatments of wood chips (solid content 65%). One hundred grams of 50% NaOH was added to the molasses over a period of 30 minutes under stirring. The temperature of the reaction mixture was varied as shown in the table below. After the addition of sodium hydroxide was complete, stirring was continued for another 30 minutes. Sodium chloroacetate (100 grams) powder was added and stirring continued for 5.5 hours at a desired temperature. The temperature effect on calcium complexing value of the final product is shown in the table. The complexing values were determined according to the procedure outlined above.

| Temperature, °C | 25 | 55 | 75 | 95 | 100 |
|---|---|---|---|---|---|
| Complexing value (× 10³) | 0.71 | 0.95 | 1.05 | 0.96 | 0.89 |

The results show that wood molasses carboxymethylated at 75° C. had the best calcium complexing value.

EXAMPLE 2

Sodium hydroxide pellets (100 grams) were added slowly to 154 grams of wood molasses (65% solid) as in Example 1. A measured amount of water was added to the molasses-hydroxide mixture to give the desired moisture content of the final reaction mixture of four separately run samples. After 30 minutes of stirring, sodium chloroacetate (100 grams) was added and the final mixture was left to react at 75° C. for 1 hour. The effect of the moisture on calcium complexing value of the product is shown in the table. The complexing values were determined according to the procedure outlined above.

| Total moisture content of final product, % | 15 | 25 | 40 | 60 |
|---|---|---|---|---|
| Complexing value, (× 10³) | 1.51 | 1.17 | 0.89 | 0.79 |

The results show that as the moisture content of the carboxymethylated wood molasses is increased above about 30% the calcium complexing ability drops below $10^{-3}$ moles/gram.

EXAMPLE 3

The procedure of this example differs from that of Example 1 in that 154 grams of wood molasses (65% solid) was reacted with 150 grams of sodium hydroxide pellets, 100 grams of water and 100 grams of sodium chloroacetate for various periods of time. The effect of the reaction time on the calcium complexing value of carboxymethyl wood molasses is shown as follows:

| Time, hours | 1 | 3 | 5 | 24 |
|---|---|---|---|---|
| Complexing value, (× 10³) | 1.20 | 1.23 | 1.26 | 1.33 |

The results show that an increases reaction time does not substantially increase the calcium complexing value.

EXAMPLE 4

This example was designed to compare the calcium complexing values of carboxymethyl wood molasses prepared from three sources of black liquors. The first source was from the steam treatment of wood chips as described above. The wood molasses (65% solid) obtained hereof from pine wood had the following typical composition:

| | | % of total solid |
|---|---|---|
| Wood molasses A | Hexosans | 40 |
| | Pentosans | 30 |
| | Lignin | 15 |
| | Carbohydrate acids | 10 |
| | Other | 5 |
| | Total | 100 |

The second source of black liquors was from alkaline cook of wood chips. The cook was as follows: 1,500 grams of pine chips, 360 grams of sodium hydroxide and 6 liters of water were charged to a steel digester. The temperature of the contents was raised from room temperature to 170° C. in 45 minutes and kept at the maximum temperature for an additional 6 hours. At the end of cook, black liquors were separated from pulps by filtration. The liquors were neutralized with hydrochloric acid to pH 7 at which most of lignin precipitates out and can be removed by filtration. The resulting filtrate was concentrated under a reduced pressure and at a temperature of 45° C. Excess sodium chloride crystallizes and settles out of the thick viscous molasses during concentration and was removed by centrifugation. The molasses (63.3% solid) contained approximately the following constituents:

| | | % of total solid |
|---|---|---|
| Wood molasses B | Saccharinic acids and other hydroxy acids | 85 |
| | Alkali lignin | 11 |
| | Sodium chloride | 4 |
| | Total | 100 |

The third source of black liquors was from sodium carbonate semi-chemical pulping of wood chips. For example, 800 grams of hardwood chips and 21 grams of sodium carbonate (or a chemical charge of 2% as $Na_2O$ on the oven-dry wood basis) were charged to a digester with a liquor-chip ratio of 4:1, and subjected to a steam pressure of 150 pounds per square inch for 15 minutes. Wood molasses obtained by concentrating the black liquor contained approximately the following organic constituents:

| Wood molasses C | | % of organic solid |
|---|---|---|
| | Pentosans | 80 |
| | Uronic acids (anhydride) | 15 |
| | Other | 5 |
| | Total | 100 |

Wood molasses A, B or C (100 grams) was reacted with 100 grams of sodium chloroacetate (moisture content of total reaction mixture, 15%) according to the procedure of Example 1 at 75° C. for 4 hours. The complexing values of the carboxymethyl wood molasses and starting materials are listed as follows with that of several hydroxy carboxylic acids:

| Sequestrant | Calcium complexing value × $10^3$ |
|---|---|
| Gluconic acid | 0.35 |
| Glucoheptonic acid | 0.45 |
| Adipic acid | 0.49 |
| Glycolic acid | 0.79 |
| Glucaric acid | 0.99 |
| Wood molasses A | 0.35 |
| Wood molasses B | 0.40 |
| Wood molasses C | 0.30 |
| Carboxymethyl wood molasses A | 1.37 |
| Carboxymethyl wood molasses B | 1.53 |
| Carboxymethyl wood molasses C | 1.55 |
| Citric acid | 3.99 |

In the following examples, carboxymethyl wood molasses A was used in the chemical formulations for de-rusting, corrosion inhibition, herbicide dispersing and detergent building applications. The particular formulations chosen herein solely for the purpose of illustration should not be taken as limiting cases of its applications, rather they are intended to exemplify the general scope of usefulness of carboxymethyl wood molasses.

EXAMPLE 5

Carboxymethyl wood molasses is a water soluble polycarboxylic calcium sequestrant of moderate complexing strength. It has been found to be an excellent de-rusting agent when used in combination with alkali and triethanolamine. An effective de-rusting formulation comprises:

| % | Preferred, % | |
|---|---|---|
| 1.0 – 5.0 | 3.9 | carboxymethyl wood molasses (CWM) |
| 0.5 – 5.0 | 1.9 | triethanolamine (TEA) |
| 5.0 – 20.0 | 13.5 | sodium hydroxide (NaOH) |
| remainder | 80.7 | water |

In conducting the de-rusting tests, five cold rolled steel coupons with dimensions 3 × ½ × 1/16 inch (from Corrosion Test Supplies Co., Baker, La.) were left to rust in a moist atmosphere and oxygen for one week. The rusty coupons were then immersed in a cleaning bath containing 500 ml of the above formulation which was maintained at about 95° C. and under mild stirring with a magnetic stirrer. After 1 hour of washing, the coupons were rinsed with tap water for 10 minutes. The clean coupons were weighed after drying in a desiccator overnight, and weight loss determined. For comparisons, tests were also performed using sodium gluconate. The results of the tests (average of measurements of five coupons) are shown in the following table:

| Formulation (grams) | | | | Weight** | |
|---|---|---|---|---|---|
| NaOH | TEA | G* | CWM | loss (%) | Surface of cleaned coupon |
| 84 | 12 | 0 | 24 | 0.208 | Clean, smooth and shining surface |
| 84 | 12 | 24 | 0 | 0.455 | Clean and smooth, but with spotty dark surface. |
| 84 | 12 | 0 | 0 | 0.270 | Dark rusty surface |
| 84 | 0 | 0 | 0 | 0.057 | No observable cleaning; brown, rusty, rough and dirty surface |
| 0 | 12 | 0 | 0 | 0.022 | Little cleaning; original brown rust remains on surface |

Notes  *G = sodium gluconate

**Weight loss (%) = $\frac{\text{weight of rusty coupon} - \text{weight of cleaned coupon}}{\text{weight of rusty coupon}}$ The data presented in the foregoing table indicate that triethanolamine, commonly used in de-rusting and metal cleaning applications, is a very corrosive chemical in combination with alkali. It attacks rust as well as clean metal surfaces and causes undesired corrosive destruction of the metal surface. Both gluconate and carboxymethyl wood molasses are capable of cleaning the rusty metal surface in combination with triethanolamine and alkali. However, whereas the dark carboxymethyl wood molasses formulation gives a clean, smooth and shining metal surface the gluconate formulation gives a surface with spotty rust and dark appearance. Since the cleaning liquor containing gluconate is a clear, colorless solution, the dark surface must be due to the incapability of gluconate to stop completely the corrosive effect of triethanolamine. The excellent corrosion inhibitive property of carboxymethyl wood molasses is further demonstrated in the next example where the product is used in a corrosion inhibition formulation.

EXAMPLE 6

An excellent corrosion inhibition formulations for metal surface according to this invention comprises:

2–10, preferably about 5,ppm carboxymethyl wood molasses (CWM)

10–50, preferably about 24,ppm zinc chloride ($ZnCl_2$)

10–100, preferably about 40,ppm organic polymers

In order to demonstrate the effectiveness of these compositions as corrosion control agents, and to demonstrate the superiority of carboxymethyl wood molasses over ethylene diaminotetracetic acid (EDTA) commonly used in the art, tests were run using a predetermined amount of standard hard water into which was placed a predetermined amount of the preferred corrosion inhibiting formulation. Each of these aqueous solutions was used in a standard corrosion test with alcohol cleaned, air-dyed steel coupons (A.S.T.M. 1010) as those used in Example 5 in a bath of which the temperature was kept at 140° F. and at a pH of 7.5–8.0. The corrosion rates are expressed in mils per year of weight loss. Data was obtained after 1 ay and 3 days total elapsed times and presented as follows:

| Composition No. | Formulation* | Corrosion Rate (mils per year) | |
|---|---|---|---|
| | | 1 day | 3 days |
| 1 | ZnCl$_2$-CWM-Polymer 1 | — | 0.76 |
| 2 | ZnCl$_2$-EDTA-Polymer 1 | 1.51 | 0.90 |
| 3 | ZnCl$_2$-CWM-Polymer 2 | 6.30 | 7.92 |
| 4 | ZnCl$_2$-EDTA-Polymer 2 | 21.30 | 15.90 |

Notes:
*Polymer 1 = Kelig-32 (lignosulfonate from American Can Co.)
Polymer 2 = Reax 88B (sulfonated kraft lignin from Westvaco Corp.)

The above table clearly indicates that carboxymethyl wood molasses is superior to EDTA as a constituent in the above corrosion control compositions.

EXAMPLE 7

2,4-D, a common herbicide, is insoluble in water in its acid form. When this chemical is converted to diethylamine salt, it becomes water soluble and is readily made into a solution for spraying on agriculture crops. However, the amine salt of 2,4-D is a weak calcium sequestrant (similar to gluconate) and in hard water it forms insoluble complexes with calcium. To solve this problem, a sequestrant is added to 2,4-D amine salt before it is dissolved in hard water. By complexing with the available calcium ions in hard water, the sequestrant can stop the formation of insoluble calcium-2,4-D complex. To test the efficacy of carboxymethyl wood molasses as a retardent of 2,4-D precipitation in hard water, 0.5 grams of various sequestrants were added to 0.7 milliliters of 2,4-D salt and 93 milliliters of 2000 ppm hard water. The precipitation of insoluble complexes in a sedimentation tube was observed and recorded in the following table:

| Sequestrant | Sediment (ml) | | | Remarks |
|---|---|---|---|---|
| | 20 min. | 15 hours | 24 hours | |
| None | 12 | — | — | Heavy cloudiness of solution appears immediately; precipitates loose and white. |
| Na-gluconate | 4 | 5 | — | Cloudiness appears immediately; Precipitates, dense and white. |
| Lignin Amine | 0 | 4 | 8 | Good solution for several hours; precipitates, white. |
| Na-citrate | 0 | 0 | 0 | Slightly cloudy solution. |
| Carboxymethyl wood molasses | 0 | 0 | 0 | Slightly cloudy solution. |

The results show that carboxymethyl wood molasses is an effective herbicide dispersant in the range of 0.1:1.0 to 1:1 of dispersant to herbicide.

EXAMPLE 8

The detergent building power of carboxymethyl wood molasses was determined in a laundry detergent formulation consisting of 80% linear alkyl-benzene sulfonate and 20% carboxymethyl wood molasses. The molasses product used herein has been decolorized with sodium dithionite as disclosed above. A U.S. Testing Company Tergotometer was employed to determine detergency which is defined as follows:

$$\% \text{ Detergency} = [(R_w-R_s)/(R_o-R_s)] \times 100$$

where $R_w$ is the reflectance of the washed swatches of cloth; $R_s$ is the reflectance of the soiled swatch and $R_o$ is the reflectance of the swatch before soiling.

Laundry washing experiments were performed at 120° F., 150 ppm water hardness and pH 9.5. In the normal procedure, one liter of hot tap water is added to calcium chloride and magnesium sulfate solutions in quantities necessary to obtain 1,000 ppm hardness. The detergent formulation is then dissolved in the solution which is then transferred to the wash bucket. After adjustment of pH, ten standard, soiled swatches are added to the bucket and wash cycle begun for 10 minutes at an agitation rate of 100 rpm. After the completion of the washing cycle, the wash solution is poured off and the swatches are squeezed out by hand and returned to the bucket. The swatches are rinsed with 1 liter of water of the same hardness and temperature for 5 minutes at 100 rpm. After the rinse cycle, the swatches are squeezed dry, separated and placed in a dryer for 30 minutes. The reflectance of the clean swatches is then determined and the percent detergency calculated using above equation. The results are presented as follows:

| Sequestrant | % Detergency |
|---|---|
| None | 32.9 |
| Adipic acid | 33.2 |

-continued

| Sequestrant | % Detergency |
|---|---|
| C. M. wood molasses | 47.0 |
| Sodium glucarate | 47.7 |
| Tripolyphosphate | 59.1 |

It is understood that laundry washing experiments usually give a wide range of results even using one sequestrant. Furthermore, the types of surfactants and formulations employed in the washing tests are important factors in determining the effectiveness of the sequestrant. The simple detergent formulation used herein was intended to show the usefulness of carboxymethyl wood molasses as a detergent builder. It is obvious from the above table, the molasses is superior to adipic acid which is at present used in a commercial detergent.

While the invention has been described and illustrated herein by references to various specific materials, preocedures and examples, it is understood that the invention is not restricted to the particular materials, combinations of materials, and procedures selected for that purpose. Numerous variations of such details can be employed, as will be appreciated by those skilled in the art.

What is claimed is:

1. An oligomeric carboxymethyl wood molasses, the amount of carboxymethylation being about 50 parts by weight to 200 parts by weight per 100 parts wood molasses.

2. The product of claim 1 wherein said carboxymethylation is from 100 parts by weight to 150 parts by weight per 100 parts wood molasses.

3. The product of claim 1 wherein the product has a moisture content below 20% by weight.

4. The product of claim 3 wherein said product is water-soluble.

5. The product of claim 1, wherein said wood molasses is from that part of alkaline pulping liquors which consists primarily of saccharinic acids and ligno-carbohydrates complexes.

6. The product of claim 1 wherein said wood molasses is from the steam treatment of wood chips and sawdusts whereupon the readily hydrolyzable hemicelluloses are rendered water-soluble.

7. The product of claim 1 wherein said wood molasses is from the black liquor from sodium carbonate semi-chemical pulping of woody materials.

8. The product of claim 1 having been treated with up to 0.2 grams/1 gram of product with a chemical from the group consisting essentially of sodium borohydride, sodium dithionite, bromine and hydrogen peroxide to reduce the color thereof.

9. The product of claim 1 having a calcium complexing value of at least $0.7 \times 10^{-3}$ moles per gram.

10. The process of producing carboxymethylated wood molasses which comprises, reacting in an aqueous system wood molasses at a solids content of 50 to 75% by weight with 50 to 150 parts sodium hydroxide per 100 parts wood molasses until a fluid mixture is formed; and adding with stirring 50 parts to 200 parts sodium chloroacetate per 100 parts wood molasses at a temperature between 25° and 100° C. for 1 hour to 24 hours.

11. The process of claim 10 wherein said sodium chloroacetate is present at 100 parts to 150 parts by weight per 100 parts of wood molasses, and said time is 2 hours to 4 hours.

* * * * *